US 6,658,127 B1

(12) United States Patent
Kim

(10) Patent No.: US 6,658,127 B1
(45) Date of Patent: Dec. 2, 2003

(54) SPEAKER SYSTEM HAVING AN AMPLIFYING HORN

(75) Inventor: Jae-Nam Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/725,762

(22) Filed: Oct. 4, 1996

(30) Foreign Application Priority Data

Apr. 22, 1996 (KR) .............................. 96-12218

(51) Int. Cl.[7] .............................................. H04R 25/00
(52) U.S. Cl. ...................... 381/340; 381/339; 381/341; 381/349
(58) Field of Search ................................. 381/153, 154, 381/156, 158, 159, 24, 337, 338, 339, 340, 342, 349, 386, 388; 181/156, 196, 198, 199, 152, 175, 177; H04N 5/64

(56) References Cited

U.S. PATENT DOCUMENTS 4,969,196 A * 11/1990 Nakamura .................. 381/156
5,025,886 A * 6/1991 Jung .......................... 381/156
5,206,465 A * 4/1993 Jung .......................... 181/152
5,455,867 A * 10/1995 Inoue et al. ................. 381/159
5,604,337 A * 2/1997 Sugimoto et al. ........... 381/156

FOREIGN PATENT DOCUMENTS

JP          406165275      * 6/1994    .................. 381/159

* cited by examiner

Primary Examiner—Huyen Le
(74) Attorney, Agent, or Firm—Sughrue Mion, PLLC

(57) ABSTRACT

Disclosed is a speaker system that can be advantageously used in a television set. The speaker system has a support member which is provided with a partition wall and mounted on both sides of the television cabinet. A speaker is securely installed in the partition wall of the support member and provided with a frame. An amplifying horn is connected to the frame for collecting and amplifying the sound waves projected toward the frame. A cover is coupled to the rear side of the support member. The speaker system collects and amplifies not only the midrange-frequency and high-frequency sounds projected toward the front of the speaker, but also some of the sound waves projected in the backward direction of the speaker, thereby providing greatly amplified bass and harmonious and sensitive sound.

7 Claims, 4 Drawing Sheets

SPEAKER SYSTEM HAVING AN AMPLIFYING HORN

BACKGROUND OF THE INVENTION

1. Field of the Invention

The present invention relates to a speaker system for a television set, and more particularly to a speaker system for a television set, which amplifies not only midrange-frequency and high-frequency sounds projected in the forward direction of a speaker, but also a low-frequency sound projected in the backward direction of the speaker, thereby improving the definition of the sound.

2. Description of the Prior Art

Generally, a speaker is an instrument for projecting sounds into space by converting an electric signal into a corresponding sound wave. In these days, a cone speaker is widely used in the speaker system. The cone speaker has a magnet disposed between a center pole and a yoke. When the magnet generates a cylindrical-shaped magnet field, an electrical current is applied to a voice coil installed within the magnet field, so that the voice coil may vibrate. The vibration of the voice coil may cause a cone-shaped vibrating plate made of a paper material to vibrate, so the sound is reproduced.

As shown in FIG. 1, a conventional television set comprises a pair of speakers 3 which are securely installed at a rear portion of a cabinet 2 having a cathode ray tube 1 therein, in such a manner that they can project the sound in the front direction thereof. Sound passages 4 having a duct 4a respectively are provided at inner side portions of the cabinet 2, so that the sound reproduced from the speaker 3 is guided into the sound passages 4, and then, is projected toward an exterior of the television set through the duct 4a.

In addition, as shown in FIG. 2, a pair of speaker boxes 5a are respectively provided at both side of a back cover 5 which is coupled to a rear side of the cabinet 2. A pair of speaker box covers 2a, which are positioned in correspondence to the speaker boxes 2a, are provided at both sides of the cabinet 2. The speakers 3 are accommodated in the speaker boxes 5a.

However, the above-mentioned conventional speaker for the television set has the disadvantages that the sound guided into the sound passages formed in the cabinet may interfere with the sound projected from the speaker accommodated in the speaker boxes, so that not only is sufficient amplifying of the sounds difficult, but also the definition of the sound is prominently lowered. Particularly, since the low-frequency sound is very poorly amplified, the speaker does not provide a harmonious and sensitive sound to the audience.

SUMMARY OF THE INVENTION

The present invention has been made to overcome the above described problem of the prior art, and accordingly, it is an object of the present invention to provide a speaker system for a television set, which collects some of sound waves projected in the backward direction of a speaker as well as the sound waves projected in the forward direction of the speaker, and then, projects the collected sounds while amplifying them, thereby providing a greatly amplified bass and a definitive and harmonious sound.

To achieve the above object, the present invention provides a speaker system for a television set which comprises a support member having a partition wall mounted at both sides of a cabinet, a speaker having a frame which is securely installed in the partition wall of the support member, an amplifying horn which collects and amplifies some of the sound waves projected toward the frame, and a cover coupled to a rear side of the support member.

BRIEF DESCRIPTION OF THE DRAWINGS

The above objects, and other features and advantages of the present invention will become apparent after a reading of the following description taken in conjunction with the drawings, in which.

DETAILED DESCRIPTION OF PREFERRED EMBODIMENTS

Hereinafter, the present invention will be described in detail.

Figure 1:
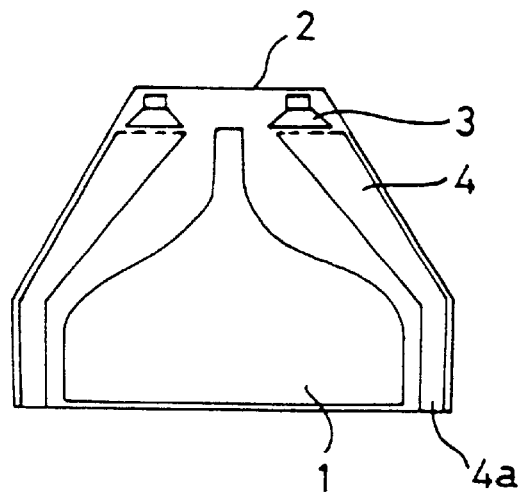
FIG. 1 is a sectional view of a conventional speaker system for a television set.
Figure 2:
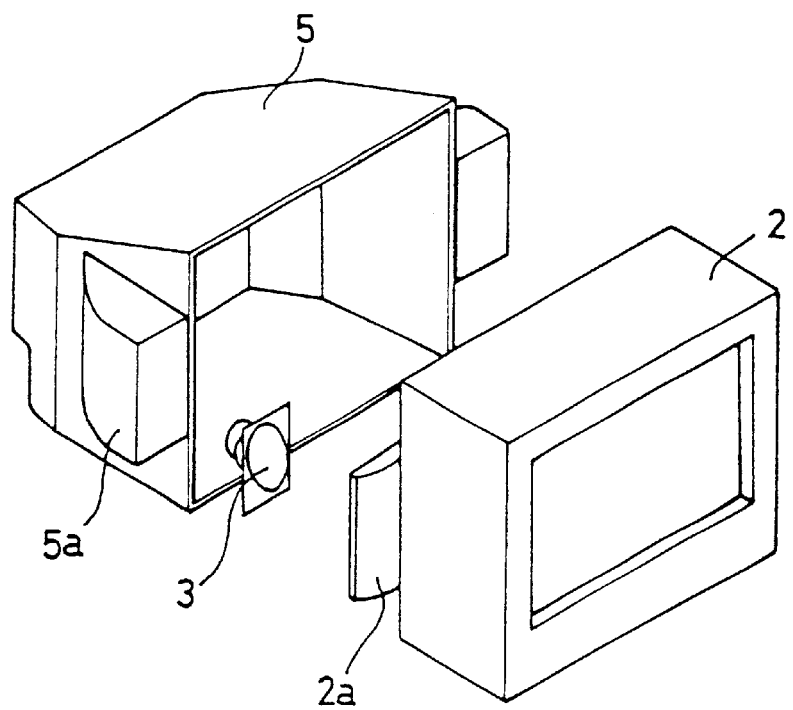
FIG. 2 is an exploded perspective view of another conventional speaker system for a television set.
Figure 3:
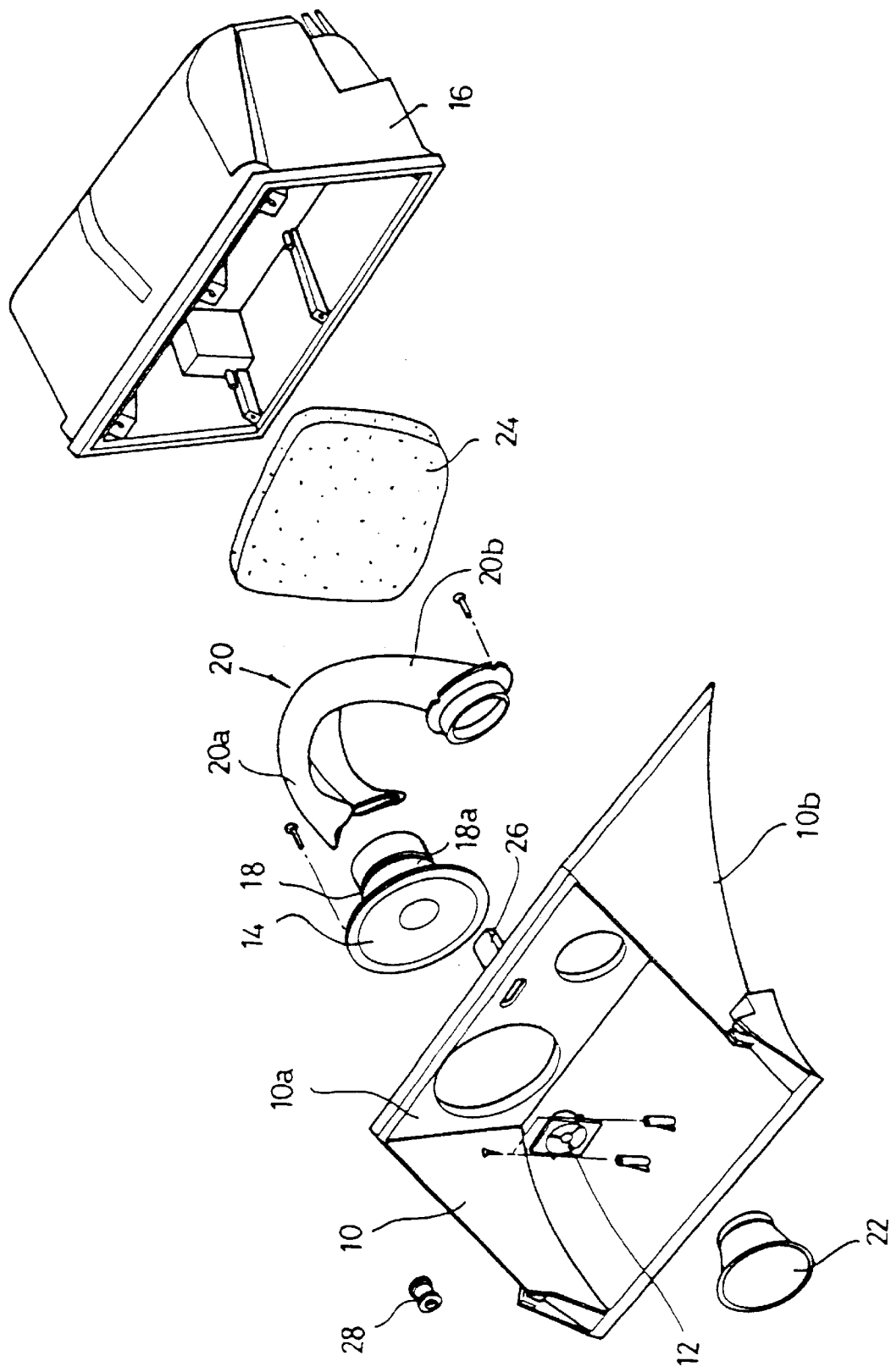
FIG. 3 is an exploded perspective view showing a speaker system for a television set according to one embodiment of the present invention.
Figure 4:
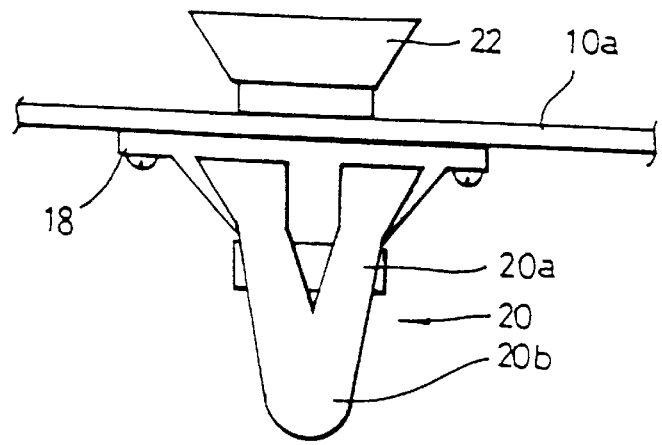
FIG. 4 is a plan view showing the main elements of a speaker system for a television set according to the present invention.
Figure 5:
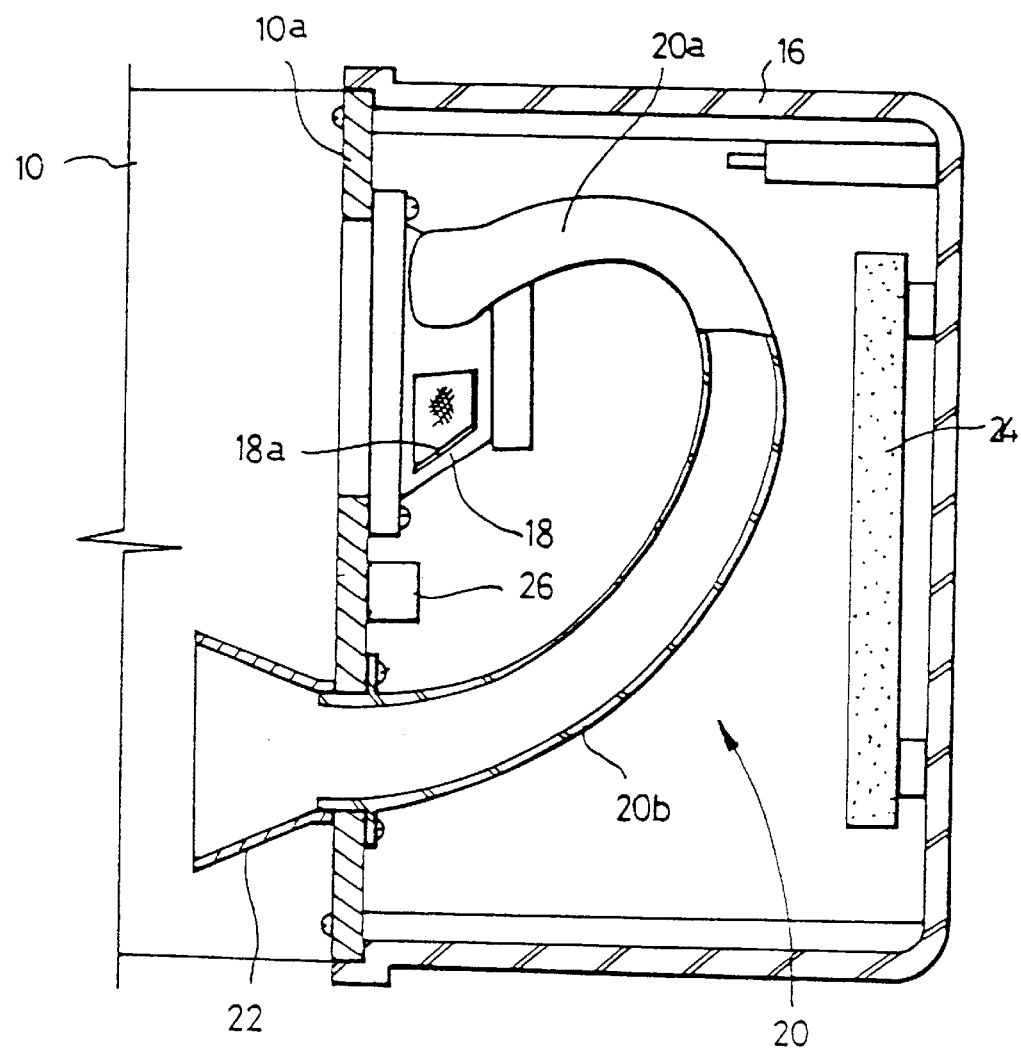
FIG. 5 is a partially sectional view of a speaker system for a television set according to the present invention.
Figure 6:
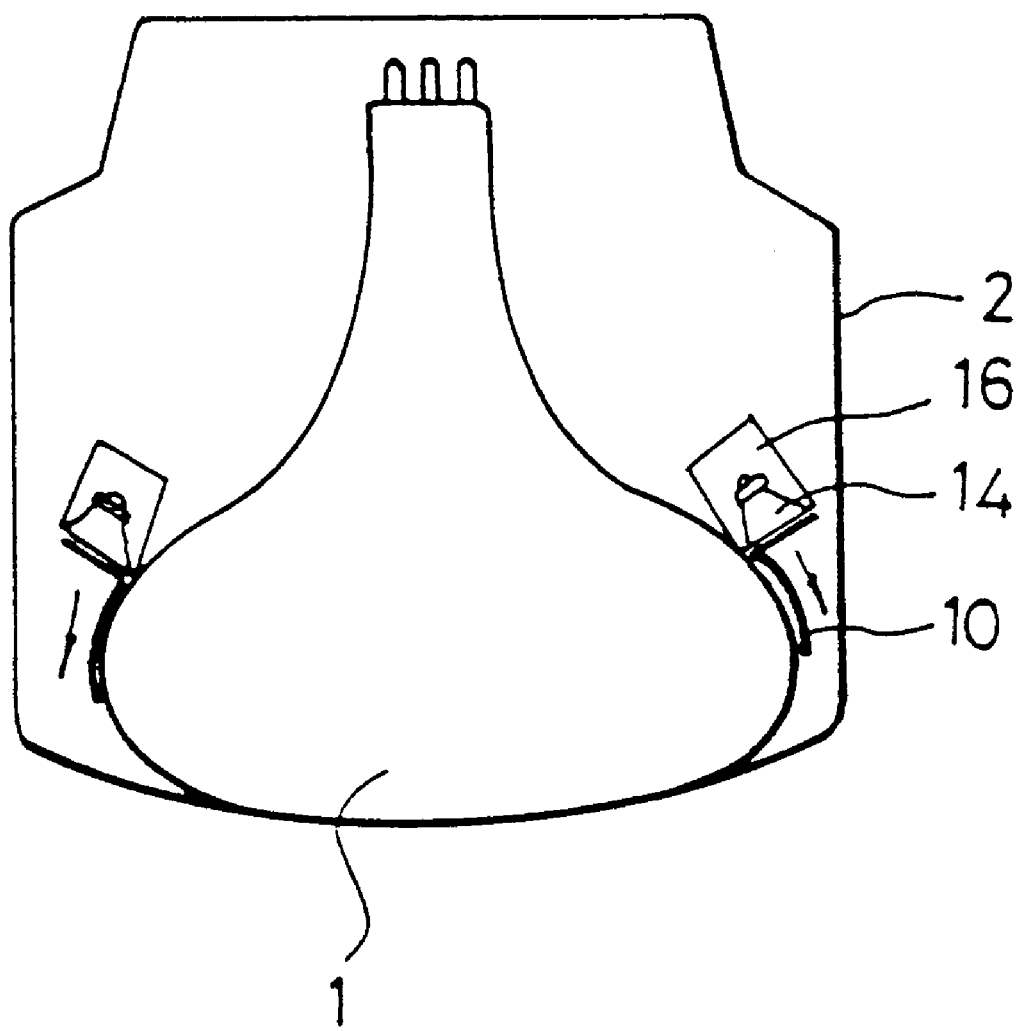
FIG. 6 is a schematic view of a television set in which a speaker system according to the present invention is installed.

FIG. 3 is an exploded perspective view showing a speaker system for a television set according to the present invention, FIG. 4 is a partial plan view of a speaker system for a television set according to the present invention, FIG. 5 is a sectional view showing the main parts of the speaker system of the present invention, and FIG. 6 is a schematic view of a television set in which a speaker system according to the present invention is installed.

As shown in the figures, a support member 10 mounted on both sides of the cabinet 2 is formed at its front side with a tweeter 12 fixedly secured thereto. In a partition wall (face plate) 10a formed at a rear side of the support member 10, a speaker 14 for reproducing low-frequencies is installed, and a cover 16 is also securely coupled to the rear side of the support member 10 thereby forming an enclosure.

A bent portion 10b having curvature the same as that of a lead end of a cathode ray tube 1 installed in the cabinet 2 is provided at one side of the support member 10.

In addition, an amplifying horn 20 is securely installed at a rear side of the speaker 14. The amplifying horn 20 has a plurality of sound collecting sections 20a and an amplifying section 20b for amplifying the sound collected in the sound collecting sections 20a. One end of each sound collecting section 20a is inserted in an opening 18a of a frame 18.

The amplifying horn 20 collects sound waves projected toward the rear side of the speaker 14 by using the sound collecting sections 20a and then amplifies the collected sound waves by using the amplifying section 20b. At this time, the amplifying section 20b may greatly amplify the low-frequency sound, so harmonious sound is reproduced.

In order to prevent a sound interference, it is preferable to design the amplifying horn 20 in such a manner that the total diameter of the sound collecting sections 20a is set as the same as the minimum diameter of the amplifying section 20b. The amplifying section 20b is geometrically tapered in the direction of a lead end thereof so as to amplify the sound wave.

In addition, the amplifying horn 20 may have one to three sound collecting sections 20a in order to collect the sound projected toward the rear side of the speaker 14. For example, if the frame 18 secured to the rear side of the speaker 14 has four openings 18, it is preferable for the amplifying horn 20 to have two sound collecting sections 20a. If the frame 18 has six openings 18a, it is preferable for the amplifying horn 20 to have three sound collecting sections 20a.

Accordingly, the number of the sound collecting sections 20a is determined according to the number of the openings 18a, and is preferably determined at a half of the number of the openings 18a.

However, the number of the sound collecting sections 20a is not limited to the half of the number of the openings 18a. In other words, the number of the sound collecting sections 20a can be determined in such a manner that the sound collecting sections 20a can collect some of the sound waves projected from the openings 18a.

In addition, it is also possible to set the number of the sound collecting sections 20a the same as the number of the openings 18a, in order to collect all of the sound waves projected from the openings 18a.

On the other hand, an exhausting horn 22 for exhausting the amplified sound wave is coupled to the lead end of the amplifying horn 20.

A sound absorbing member 24, which absorbs some of sound waves deviating the amplifying horn 20 thereby reducing the noise, is provided at an inner side of the cover 16, and a reflex duct 26 for exhausting the sound waves which have not been absorbed by the sound absorbing member 24 is formed at the center of the partition wall 10a.

In addition, vibro-isolating members 28 for preventing the vibration caused by the sound waves projected from the speaker 14 are securely interposed between the support member 10 and the cabinet 2.

The speaker system having the above-mentioned construction operates as follows.

When the magnet generates a cylindrical-shaped magnetic field, a cone paper may vibrate so that the sound wave is generated by the vibration of the cone paper. The sound wave is projected toward the front of the television set through the speaker 14 and the tweeter 12, thereby providing the high-frequency and midrange-frequency sounds.

At this time, some of the sounds projected in the backward direction of the speaker 14 are collected and amplified through the amplifying horn 20, and then are projected toward the front of the television set through the exhausting horn 22.

That is, some of the sound waves projected through the openings 18a of the frame 18 is collected by the sound collecting sections 20a formed at the lead end of the amplifying horn 20 and is amplified by the amplifying section 20b, and then is projected through the exhausting horn 22. Accordingly, the audience can listen not only to the midrange-frequency and high-frequency sounds, but also greatly amplified bass.

In addition, the sound wave which is not collected in the amplifying horn 20 is projected through the openings 18a of the frame 18. After that, some of the sound wave is absorbed by the sound absorbing member 24 disposed in the cover 16 thereby reducing noise, and the remaining sound wave is projected toward the front of the television set through the reflex duct 26.

At this time, since the tweeter 12, speaker 14 and exhausting horn 22 are fixedly disposed in different positions with respect to each other, the sound interference caused by the projection of the sound wave may be minimized, so that definitive and harmonious sound is reproduced.

In addition, since the vibro-isolating member 28 is interposed between the support member 10 and the cabinet 2, the vibration of the support member 10 caused by the sound wave projected from the speaker 14 is minimized while the speaker 14 operates. Particularly, since the bending portion 10b having curvature the same as that of the lead end of the cathode ray tube 1 is formed at one side of the support member 10, the speaker system can be easily assembled and can be installed even on a narrow space.

As mentioned above, the present invention provides a speaker system which collects and amplifies not only the midrange-frequency and high-frequency sounds projected in the forward direction of the speaker, but also some of the sound waves projected in the backward direction of the speaker, thereby providing greatly amplified bass and harmonious and sensitive sound.

Though both the support member having the speaker therein and the amplifying horn are shown as they are disposed in the television cabinet in this embodiment, according to other embodiments of the present invention, they can be disposed at both sides or upper and lower sides of the television cabinet.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. A speaker system comprising:

an enclosure having a face plate and a cover, wherein said enclosure is secured inside a television cabinet using a vibro-isolating member;

a speaker securely installed to the face plate inside the enclosure, the speaker having a frame with a plurality of openings;

an amplifying horn having a plurality of sound collecting sections, each of the sound collecting sections connected to at least one of the openings of the frame and having a sound collecting opening for collecting and amplifying sound waves rearwardly projected by the speaker toward the openings of the frame.

2. A speaker system as claimed in claim 1, wherein a total diameter of the plurality of sound collecting openings is equal to minimum diameter of a sound amplifying section of said amplifying horn.

3. A speaker system as claimed in claim 1, wherein the face plate has a tweeter installed thereon.

4. A speaker system as claimed in claim 1, wherein the cover is provided with a sound absorbing member.

5. A speaker system as claimed in claim 1, wherein the face plate is provided with a reflex duct for exhausting sound waves which are not absorbed.

6. A speaker system as claimed in claim 1, wherein the enclosure has a bending portion having a curvature following the curvature of a lead end of a cathode ray tube.

7. A speaker system as claimed in claim 1, wherein an exhausting horn is coupled to a lead end of the amplifying horn.

* * * * *